US010077402B2

(12) United States Patent
Disselhorst et al.

(10) Patent No.: US 10,077,402 B2
(45) Date of Patent: Sep. 18, 2018

(54) PRODUCTION OF SYNTHESIS GAS

(71) Applicant: Air Products and Chemicals, Inc., Allentown, PA (US)

(72) Inventors: Johannes Hermanus Maria Disselhorst, Castricum (NL); Robert Schouwenaar, Amsterdam (NL); Joachim Ottomar Wolff, Amsterdam (NL)

(73) Assignee: Air Products and Chemicals, Inc., Allentown, PA (US)

( * ) Notice: Subject to any disclaimer, the term of this patent is extended or adjusted under 35 U.S.C. 154(b) by 658 days.

(21) Appl. No.: 14/352,070

(22) PCT Filed: Oct. 17, 2012

(86) PCT No.: PCT/EP2012/070528
§ 371 (c)(1),
(2) Date: Apr. 16, 2014

(87) PCT Pub. No.: WO2013/057128
PCT Pub. Date: Apr. 25, 2013

(65) Prior Publication Data
US 2014/0311884 A1 Oct. 23, 2014

(30) Foreign Application Priority Data
Oct. 18, 2011 (EP) ..................... 11185655

(51) Int. Cl.
C10B 21/00 (2006.01)
B05B 15/08 (2006.01)
C01B 3/24 (2006.01)
C10J 3/50 (2006.01)
C10J 3/46 (2006.01)
C10J 3/48 (2006.01)
C01B 3/36 (2006.01)
F23D 14/22 (2006.01)
F23D 17/00 (2006.01)

(52) U.S. Cl.
CPC .............. *C10B 21/00* (2013.01); *C01B 3/363* (2013.01); *F23D 14/22* (2013.01); *F23D 17/002* (2013.01)

(58) Field of Classification Search
CPC combination set(s) only.
See application file for complete search history.

(56) References Cited

U.S. PATENT DOCUMENTS

| 3,127,156 | A | * | 3/1964 | Shepherd | .............. F23D 17/002 431/8 |
| 3,308,869 | A | * | 3/1967 | Livingston | .............. F23D 11/10 236/1 E |
| 3,847,564 | A | | 11/1974 | Marion et al. | |
| 4,443,228 | A | * | 4/1984 | Schlinger | ................ C01B 3/363 239/112 |
| 4,443,230 | A | * | 4/1984 | Stellaccio | ................ C10J 3/506 252/373 |
| 4,490,156 | A | * | 12/1984 | Marion | ..................... C01B 3/32 431/90 |
| 4,525,175 | A | * | 6/1985 | Stellaccio | ................ C10J 3/506 239/132.3 |
| 4,566,880 | A | * | 1/1986 | Seipenbusch | ............. F41A 9/00 239/402.5 |
| 4,836,831 | A | * | 6/1989 | Martens | .................. C01B 3/363 252/373 |
| 4,857,075 | A | * | 8/1989 | Lipp | ........................ C10J 3/506 239/132.3 |
| 4,946,475 | A | | 8/1990 | Lipp et al. | |
| 5,087,271 | A | | 2/1992 | Stellaccio et al. | |
| 5,656,042 | A | * | 8/1997 | Khan | ....................... C10J 3/466 48/197 A |
| 5,785,721 | A | * | 7/1998 | Brooker | ................... C10J 3/506 239/419.5 |
| 5,941,459 | A | * | 8/1999 | Brooker | ................... C10J 3/485 239/397.5 |
| 5,957,678 | A | * | 9/1999 | Endoh | .................... F23G 7/065 431/187 |

(Continued)

FOREIGN PATENT DOCUMENTS

| CN | 85107305 A | 7/1986 |
| EP | 0098043 | 1/1984 |
| EP | 0343735 | 11/1989 |
| GB | 2219003 | 11/1989 |
| WO | 9532148 | 11/1995 |
| WO | 9603345 | 2/1996 |
| WO | 2008006869 | 1/2008 |

OTHER PUBLICATIONS

International Preliminary Report on Patentability; PCT/EP2012/070528 dated Jan. 30, 2014; 15 pages.

*Primary Examiner* — Kaity V Chandler
(74) *Attorney, Agent, or Firm* — Bryan C. Hoke, Jr.

(57) ABSTRACT

A process for the production of synthesis gas by partial combustion of a hydrocarbon feed using a burner with a plurality of coaxial channels, the method comprising the following steps: supplying a non-gaseous hydrocarbon feed using at least one of the plurality of coaxial channels; supplying a gaseous hydrocarbon feed using at least one of the plurality of coaxial channels; supplying an oxidizer gas using at least one of the plurality of coaxial channels; separately supplying a moderator gas using at least one of the plurality of coaxial channels; arranging the at least one channel supplying the non-gaseous hydrocarbon feed between two adjacent channels among the plurality of coaxial channels, wherein the two adjacent channels both supplying a flow containing the gaseous hydrocarbon feed or respectively supplying a flow containing the gaseous hydrocarbon feed and a flow of the moderator gas.

12 Claims, No Drawings

(56) References Cited

U.S. PATENT DOCUMENTS

| | | | | |
|---|---|---|---|---|
| 6,070,411 A * | 6/2000 | Iwai | ............ | F23D 17/00 60/737 |
| 6,352,680 B1 * | 3/2002 | Watson | ............ | C01B 17/04 423/237 |
| 6,588,230 B1 * | 7/2003 | Adler | ............ | C03B 19/1407 239/416 |
| 6,773,630 B2 * | 8/2004 | Stellaccio | ............ | C01B 3/363 252/373 |
| 7,569,156 B2 | 8/2009 | DeJong | | |
| 7,993,131 B2 * | 8/2011 | Douglas | ............ | C10J 3/485 110/235 |
| 8,070,484 B2 * | 12/2011 | Just | ............ | F23D 1/00 431/12 |
| 9,145,524 B2 * | 9/2015 | Stevenson | ............ | C10J 3/506 |
| 9,488,371 B2 * | 11/2016 | Shi | ............ | F23N 1/002 |
| 2004/0006991 A1 * | 1/2004 | Stuttaford | ............ | F23L 7/002 60/776 |
| 2006/0147853 A1 * | 7/2006 | Lipp | ............ | B01J 4/002 431/8 |
| 2009/0064909 A1 * | 3/2009 | Mennie | ............ | F23G 7/065 110/212 |

* cited by examiner

PRODUCTION OF SYNTHESIS GAS

PRIORITY CLAIM

The present application is the National Stage (§ 371) of International Application No. PCT/EP2012/070528, filed 17 Oct. 2012, which claims priority from European Patent Application No. 11185655.5, filed Oct. 18, 2011, the disclosures of which are hereby incorporated by reference.

The present invention relates to a process and a reactor for the production of synthesis gas by partial combustion of a hydrocarbon feed using a burner with a plurality of coaxial burner channels.

Synthesis gas is a gas comprising carbon monoxide and hydrogen gas and is typically used as a fuel gas or as a feedstock for the synthesis of methanol, ammonia, various other chemicals, or gaseous or liquid hydrocarbons.

EP 0 343 735 A2 discloses a process for synthesis gas production by partial combustion of a liquid or solid fuel using a multi-orifice burner with five coaxial channels. A hydrocarbon gas is supplied via the central channel and the outer annular channel. A drawback of this known process is that flames can settle on the tip of the conduit separating the fuel from the oxidizer gas, especially if the fuel is a liquid with a large fraction of volatile hydrocarbons. This can lead to thermal degradation of the conduit.

U.S. Pat. No. 7,569,156 discloses a different synthesis gas production process using a multi-orifice burner wherein steam supply channels separate oil channels from oxidizer gas channels.

For many applications it is important to generate synthesis gas at a specific ratio of H2 to CO. For other applications it is important to generate synthesis gas with a high H2 content.

It is an object of the invention to provide a process and a reactor for synthesis gas production with a controllable H2 content under stable and controllable process conditions.

It has been found that this object can be achieved with a process for the production of synthesis gas by partial combustion of a hydrocarbon feed using a burner with a plurality of coaxial channels, including:
  at least one channel supplying a non-gaseous hydrocarbon feed;
  at least one channel supplying a gaseous hydrocarbon feed;
  at least one channel supplying an oxidizer gas;
  at least one channel supplying a moderator gas.

Moderator gases are non-hydrocarbon gases comprising for instance steam, carbon dioxide or mixtures thereof.

A channel supplying the oil flow can for example be arranged between two adjacent channels supplying flows of a moderator gas or between two adjacent channels supplying flows containing a gaseous hydrocarbon feed, or between two adjacent channels, respectively supplying a flow of a moderator gas and a flow containing a gaseous hydrocarbon feed. It has been found that this avoids thermal degradation of the conduit tip, which results in less fluctuations of the reactor temperature.

The gaseous hydrocarbon feed can for example be supplied via a single channel, e.g., the central channel or the outer channel, or via more than one channel. Alternatively, the gaseous hydrocarbon feed can be supplied via any other of the present channels, if so desired. In a particular embodiment, the gaseous hydrocarbon feed can be supplied via the outer annular channel and via the central channel of a coaxial multi-orifice burner, e.g., of a burner with seven coaxial channels.

The gaseous hydrocarbon feed can for example contain pure hydrocarbon gas or be a mixture of a moderator gas and a hydrocarbon gas and optionally other gases. The flow containing hydrocarbon gas can for example have a hydrocarbon gas content in the range of 30-70 wt. %, e.g., of 45-55 wt. %. The rest of the content can, e.g., include steam and optionally further gases. If more than one flow containing a gaseous hydrocarbon feed is used, these may have the same composition or different compositions.

The gaseous hydrocarbon feed can for example contain natural gas, mainly comprising methane. The methane content can for instance be about 80-100 wt. %. Ethane, propane, butane and isobutane can also be present.

The oxidizer gas can be any gas containing oxygen. Suitable examples are air and purified oxygen gas, e.g., having an oxygen content of 95 vol. % or more. Optionally, the oxidizer can be pre-mixed with a moderator gas, such as steam. The content of moderator gas can for example be between about 10 wt. % and about 30 wt. %

The non-gaseous hydrocarbon feed can be solid or liquid. If synthesis gas is to be made of a solid fuel, use can be made of particulate hydrocarbon material, such as pulverized coal, dispersed in gas or in a liquid, such as oil or water. Suitable liquid fuels can for instance include natural gasolines, kerosenes, gas oils, naphthas, diesel fuels, crude oils, and residual products remaining after application of a separation method such as, distillation or extraction on, for example, crude oil, tar sand, shale oil or coal extracts. Hydrocarbons containing other atoms, such as oxygen, can also be used provided that the content of such atoms is sufficiently low to avoid interference with self-sustaining combustion. Particularly suitable are heavy crude oil residues, e.g., having a kinematic viscosity between 1 and 3000 cSt, or between 1 and 1000 cSt as measured at the temperature of the hydrocarbon feed as it is supplied to the burner.

In a specific refinement a burner can be used provided with coaxial channels including:
  a first inner central channel supplying a flow of oxidizer gas,
  an adjacent annular second channel supplying a flow containing steam,
  a third channel supplying a flow containing oil,
  an outer fourth channel supplying a gaseous hydrocarbon feed.

In a further specific refinement a burner can be used provided with coaxial channels including:
  a first inner central channel supplying a first flow of an oxidizer gas,
  an adjacent annular second channel supplying a second flow of an oxidizer gas with a flow rate which is higher than the flow rate of the first flow;
  a third channel supplying a flow of steam,
  a fourth channel supplying a flow containing oil,
  an outer fifth channel supplying a gaseous hydrocarbon feed.

The flow rate of the first flow can for instance be about 10-50%, e.g., 20-40% of the flow rate of the second flow. Optionally, the flow of oxidizer gas in the central channel can be replaced by a flow containing a hydrocarbon gas.

In a further refinement a burner can be used with six coaxial channels including:
  a first inner central channel supplying an oxidizer gas,
  a second channel supplying a flow of steam,
  a third channel supplying a flow containing oil,
  a fourth channel supplying a flow of steam,
  a fifth channel supplying an oxidizer gas and an outer sixth channel supplying a flow of a gaseous hydrocarbon feed.

In yet another refinement a burner can be used provided with seven coaxial channels including:
   a first inner central channel supplying a flow of a gaseous hydrocarbon feed,
   an adjacent annular second channel supplying an oxidizer gas,
   a third channel supplying a flow of steam,
   a fourth channel supplying a flow containing oil,
   a fifth channel supplying a flow of steam,
   a sixth channel supplying an oxidizer gas and
   an outer seventh channel supplying a flow of a gaseous hydrocarbon feed.

Optionally, the gaseous hydrocarbon feed in the first channel can be replaced by a flow of an oxidizer gas, or the gaseous hydrocarbon feed in the seventh channel can be replaced by a steam flow.

Those skilled in the art will be able to generate other combinations within the scope of the present invention.

The flow(s) containing a gaseous hydrocarbon feed, such a mixture of steam with natural gas, through the central channel can for instance have a medium flow velocity of 5-85 m/sec, more particular of about 25-about 65 m/sec.

The flow(s) containing an oxidizer gas can for instance have a medium flow velocity of about 50-about 150 m/sec, more particular of about 80-about 120 m/sec.

The flow(s) containing a moderator gas, such as steam, can for instance have a medium flow velocity of 5-85 m/sec, more particular of about 25-about 65 m/sec.

The non-gaseous hydrocarbon feed, such as oil, can for instance have a medium flow velocity of about 15 m/sec or less, more particular of about 7-about 12 m/sec.

The various flow velocities can be varied by appropriate dimensioning of the flow through capacities of the coaxial channels.

In a particular embodiment the process can be carried out at a pressure between about 0.1-12 MPa, e.g., of about 0.5-6 MPa. The temperature in the reactor will typically be in the range of about 1000° C. to about 1800° C.

It has been found that the process of the present disclosure makes it possible to achieve any H2/CO ratio between about 0.75 (e.g., when the mass flow ratio of hydrocarbon gas to liquid is very low or 0) and about 1.25 (e.g., when the mass flow ratio of hydrocarbon gas to liquid is very high, e.g., 1).

The process can be practiced with a reactor comprising a burner with a plurality of coaxial burner channels, wherein at least one channel is operatively connected to a supply of a non-gaseous hydrocarbon feed, at least one other channel is operatively connected to a supply of a gaseous hydrocarbon feed and at least one channel is operatively connected to a supply of a moderator gas.

In a particular embodiment, the process can be practiced with a reactor comprising a burner comprising seven coaxial channels:
   a first inner central channel supplying a flow of a gaseous hydrocarbon feed,
   an adjacent annular second channel supplying an oxidizer gas,
   a third channel supplying a flow of steam,
   a fourth channel supplying a flow containing oil,
   a fifth channel supplying a flow of steam,
   a sixth channel supplying an oxidizer gas and
   an outer seventh channel supplying a flow of a gaseous hydrocarbon feed.

Optionally, the gaseous hydrocarbon feed in the first channel can be replaced by a flow of an oxidizer gas, or the gaseous hydrocarbon feed in the seventh channel can be replaced by a steam flow.

The burner can comprise a number of slits at the burner outlet and hollow wall members with internal passages for a cooling fluid, such as water. Optionally, these passages may be converging at the burner outlet. The burner may further be provided with a ceramic or refractory lining applied onto or suspended by a means closely adjacent to the outer surface of the burner wall for resisting the heat load during operation or heat-up/shut down situations of the burner. The channels may be provided with retracted or protruding exit(s), if so desired.

The reactor may further comprise a vessel, such as a vertically oriented cylindrical vessel having an outlet for the mixture of carbon monoxide and hydrogen at its lower end. The burner can for instance be arranged at the top end of the reactor vessel.

Optionally, the reactor can have more than one burner, if so desired.

That which is claimed is:

1. A process for the production of synthesis gas by partial combustion of a hydrocarbon feed using a burner with a plurality of coaxial channels, the method comprising the following steps:
   supplying a non-gaseous hydrocarbon feed using at least one of the plurality of coaxial channels;
   supplying a gaseous hydrocarbon feed using at least one of the plurality of coaxial channels;
   supplying an oxidizer gas using at least one of the plurality of coaxial channels;
   separately supplying a moderator gas using at least one of the plurality of coaxial channels;
   arranging the at least one channel supplying the non-gaseous hydrocarbon feed between two adjacent channels among the plurality of coaxial channels,
   wherein the two adjacent channels both supplying a flow containing the gaseous hydrocarbon feed or respectively supplying a flow containing the gaseous hydrocarbon feed and a flow of the moderator gas.

2. A process according to claim 1, wherein the gaseous hydrocarbon feed is at least partly supplied via a central channel among the plurality of coaxial channels.

3. A process according to claim 1, wherein the gaseous hydrocarbon feed is at least partly supplied via an outer channel among the plurality of coaxial channels.

4. A process according to claim 1, wherein the gaseous hydrocarbon feed is supplied via only one of the plurality of coaxial channels.

5. A process according to claim 1, wherein the gaseous hydrocarbon feed is a mixture of steam and a hydrocarbon gas.

6. A process according to claim 5, wherein the gaseous hydrocarbon feed has a hydrocarbon gas content in the range of 30-70 wt. %.

7. A process according to claim 1, wherein the gaseous hydrocarbon feed is natural gas.

8. A process according to claim 1, wherein the moderator gas is steam.

9. A process according to claim 1 using a burner with coaxial channels including:
   a first inner central channel supplying a gaseous hydrocarbon feed,
   an adjacent annular second channel supplying an oxidizer gas, a third channel supplying a flow of steam,
a fourth channel supplying a flow containing oil,
a fifth channel supplying a flow of steam,
a sixth channel supplying an oxidizer gas and
an outer seventh channel supplying a gaseous hydrocarbon feed.

10. A process according to claim 1 using a burner with coaxial channels including:
a first inner central channel supplying a first flow of an oxidizer gas,
an adjacent annular second channel supplying a second flow of an oxidizer gas with a flow rate which is higher than the flow rate of the first flow;
a third channel supplying a flow of steam,
a fourth channel supplying a flow containing oil,
an outer fifth channel supplying a gaseous hydrocarbon feed.

11. A process according to claim 1 wherein,
the at least one channel supplying the gaseous hydrocarbon feed includes a first inner central channel and an outer seventh channel;
the at least one channel supplying the oxidizer gas includes an adjacent annular second channel and a sixth channel;
the at least one channel separately supplying the moderator gas includes a third channel and a fifth channel each providing a flow of steam;
the at least one channel supply the non-gaseous hydrocarbon feed includes a fourth channel supplying a flow containing oil.

12. A process according to claim 1 wherein,
the at least one channel supplying the moderator gas includes a first inner central channel supplying a first flow of the oxidizer gas, and an adjacent annular second channel supplying a second flow of the oxidizer gas with a flow rate which is higher than the flow rate of the first flow;
the at least one channel separately supplying the moderator gas includes a third channel supplying a flow of steam;
the at least one channel supplying the non-gaseous hydrocarbon feed includes a fourth channel supplying a flow containing oil;
the at least one channel supplying the gaseous hydrocarbon feed includes an outer fifth channel.

* * * * *